Figure 4:
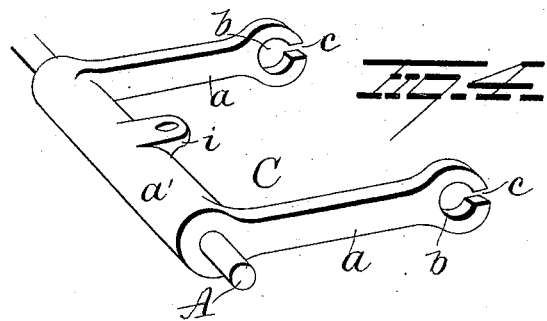
Figure 5:
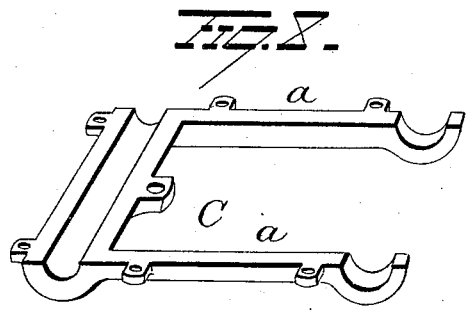
Figure 6:
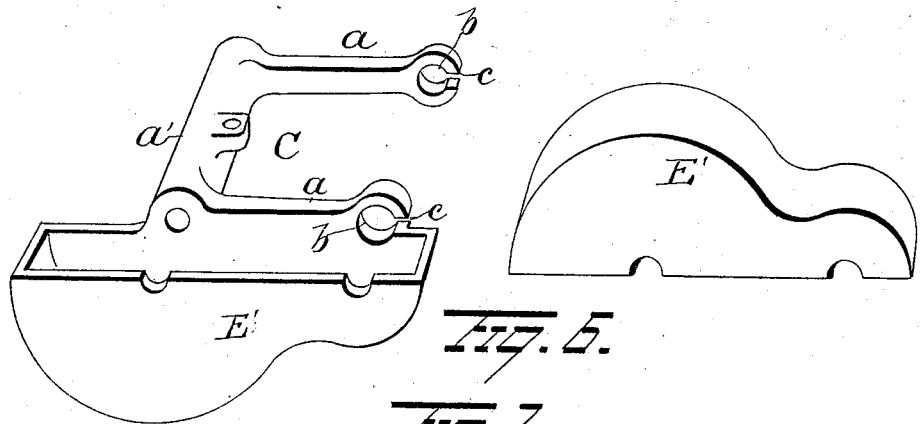
Figure 7:
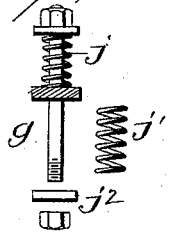

(No Model.) 2 Sheets—Sheet 1.
S. H. SHORT.
MEANS FOR CONNECTING MOTORS TO CAR AXLES.
No. 540,029. Patented May 28, 1895.
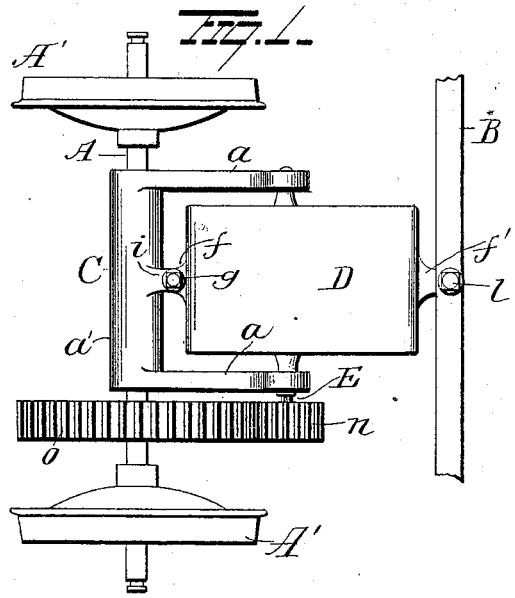
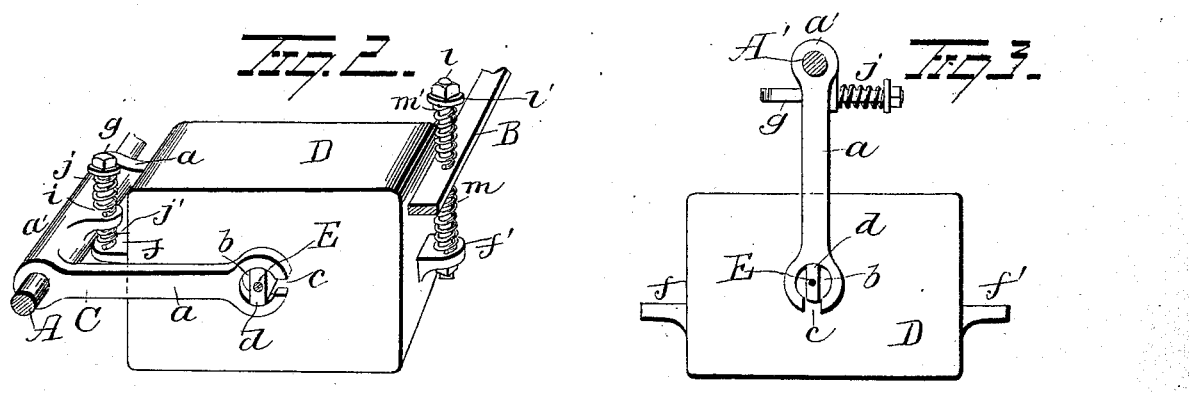
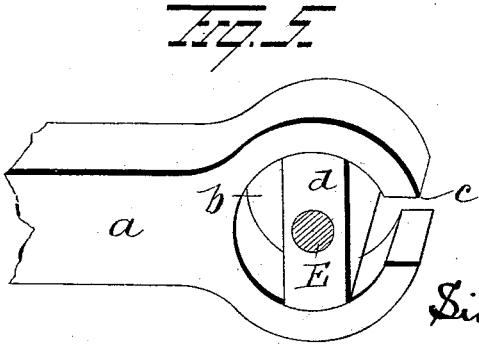
Witnesses
E. Nottingham
G. F. Downing
Inventor
Sidney H. Short
By H. A. Seymour
Attorney (No Model.) 2 Sheets—Sheet 2.

S. H. SHORT.
MEANS FOR CONNECTING MOTORS TO CAR AXLES.

No. 540,029. Patented May 28, 1895.

Witnesses
E. W. Nottingham
G. F. Downing

Inventor
Sidney H. Short
By H. A. Seymour
Attorney

THE NORRIS PETERS CO., PHOTO-LITHO., WASHINGTON, D. C.

UNITED STATES PATENT OFFICE.

SIDNEY H. SHORT, OF CLEVELAND, OHIO.

MEANS FOR CONNECTING MOTORS TO CAR-AXLES.

SPECIFICATION forming part of Letters Patent No. 540,029, dated May 28, 1895.

Application filed October 19, 1893. Serial No. 488,613. (No model.)

*To all whom it may concern:*

Be it known that I, SIDNEY H. SHORT, of Cleveland, in the county of Cuyahoga and State of Ohio, have invented certain new and useful Improvements in Electrical Locomotives; and I do hereby declare the following to be a full, clear, and exact description of the invention, such as will enable others skilled in the art to which it appertains to make and use the same.

My invention relates to an improvement in electric locomotives and more particularly to devices for supporting street railway motors on the truck or car.

Heretofore it has been the custom to journal one end of the motor on the car axle and support the other end flexibly by the bar forming part of the car truck frame.

The object of this invention is to support the entire motor flexibly and not permit the heavy motor to be journaled directly on the car axle, but to be supported at both ends on springs or other flexible device. The object to be attained in thus flexibly supporting the motor is to avoid the heavy hammer blow upon the axle, wheels and rail joints where the motor is directly journaled to the axle.

A further object is to provide means by which the motor can be quickly and readily removed from the car truck and another one placed in position in a short space of time.

With these objects in view the invention consists in certain novel features of construction and combinations and arrangements of parts as hereinafter set forth and pointed out in the claims.

In the accompanying drawings, Figure 1 is a plan view. Fig. 2 is a detail perspective view illustrating my improvements. Fig. 3 is a view showing the manner of assembling the motor and the U-shaped frame. Figs. 4, 5, 6, and 7 are detail views. Fig. 8 is a view of a modification of the U-shaped frame.

A represents an axle provided with the usual car wheels A', and B illustrates a bar of a truck frame. A U-shaped frame C is mounted loosely at one end on the axle. This frame comprises two parallel arms $a$, $a$, cast integral with a sleeve $a'$, through which latter the axle loosely passes. The free ends of the arms $a$, $a$, are preferably somewhat enlarged and made with circular openings or journal bearings $b$, $b$, the extremities of said arms being made with slots $c$, $c$, which communicate with the openings $b$. These slots are not absolutely essential but are desirable as they will readily permit of the mounting and dismounting of the motor as will be presently explained and as will be clearly understood upon reference to Fig. 3 of the drawings.

In Fig. 4, the frame C is shown complete within itself, and may be made of a single casting and slipped over the axle, or it may be made in two duplicate parts bolted together, one of such parts or halves being shown in Fig. 8.

The motor D may be of any desired construction and is located between the arms $a$ of the frame C. The trunnions $d$ of the motor D are preferably made rectangular in cross section with their upper and lower edges slightly curved,—whereby to permit their ready passage through the slots $c$, as shown in Fig. 3, when mounting said trunnions in the bearings $b$. By thus mounting the motor on the frame C it will be permitted to swing freely and when the car is over the pit in the car barn, the motor can be swung down until the flat sides of the trunnions can slip out through the slots $c$ and be entirely freed from the car when the yielding devices (hereinafter described) shall have been detached. Another motor can then be readily placed in position. The trunnions $d$ are perforated to constitute bearings for the armature shaft of the motor.

The motor D is provided at its ends with lugs or ears $f$, $f'$. The lug $f$ is perforated for the accommodation of a bolt $g$, which also passes loosely through a perforated lug or ear $i$ projecting from the sleeve $a'$ of the frame C. A spring $j$ is located on the bolt or rod $g$ and interposed between the lugs or ears $f$, $i$, and a spring $j'$ encircles the bolt or rod $g$ between the lug or ear $f$ and a washer $j^2$ at the upper end of the bolt or rod.

A bolt or rod $l$ passes loosely through the bar B of the truck frame, and extends above and below the same, said bolt or rod also passing through the lug or ear $f'$. A spring $m$ encircles the bolt $l$ and bears at its respective ends on the bar B and lug or ear $f'$. Another spring $m'$ encircles the rod or bolt $l$, said spring bearing at one end on the bar B and at the other end against a washer $l'$ at the upper end of the rod or bolt. A pinion $n$ is secured on the armature shaft E of the motor and transmits motion to a gear wheel $o$ keyed to the axle A. It is evident that motion may be imparted from the motor shaft to the axle through the medium of an intermediate shaft.

From the construction and arrangement of parts as above described, it will be readily seen that no matter what position the motor takes as a whole, or whether it may tip at one end more than at the other, the distance between the center of the axle and the center of the pinion or armature shaft, will always remain the same. Therefore I can place a gear wheel on the axle and a pinion on the armature shaft, and they will always be in proper mesh and run on their pitch diameters while the motor may move nearly vertically up and down on its springs freely when running over rough surfaces on the track. It is customary to cover these gears with a gear box to prevent dust from cutting them away. The gear box $E'$ which I employ may be made separate and attached to the frame C or it may be made integral with the U-shaped frame, being cast in whole or in part with it.

I do not claim broadly as my invention, the combination of a truck frame and axle, a guiding frame, a motor carried by the guiding frame, gearing between said motor and axle and devices for yieldingly supporting said motor at both sides. Neither do I claim broadly a car motor having its armature mounted in the motor frame and carrying a pinion co-operating with a gear rigidly secured to the car axle, means for supporting one end of the motor frame upon the car truck, elastic cushions supporting the other end of the motor upon journal boxes mounted on the car axle and rigid links connecting said journal boxes with the body of the motor so as to keep the armature in alignment with the axle and permit the motor body to yield vertically.

Various slight changes might be made in the details of construction of my invention without departing from the spirit thereof or limiting its scope and hence I do not wish to limit myself to the precise details of construction herein set forth; but, Having fully described my invention, what I claim as new, and desire to secure by Letters Patent, is—

1. In an electric car or locomotive the combination with an axle and a swinging frame journaled at one end of the axle, the free ends of said frame being provided with open bearings, of a motor journaled in the said open bearings, the motor trunnions being of such form that by turning the motor out of its normal position the trunnions may be inserted within or disengaged from said bearings, but when in its normal position said trunnions are retained against displacement, substantially as set forth.

2. In an electric car or locomotive, the combination with an axle and truck frame, of a swinging frame, slotted bearings at the free ends of the arms of said swinging frame and a motor having trunnions adapted to enter said bearings and move therein, substantially as set forth.

3. In an electric car or locomotive, the combination with an axle and truck frame, of a swinging frame mounted at one end on the axle, slotted bearings at the free ends of the arms of said swinging frame, a motor between said arms and flattened trunnions projecting from said motor and adapted to enter and move in said slotted bearings, susbtantially as set forth.

In testimony whereof I have signed this specification in the presence of two subscribing witnesses.

SIDNEY H. SHORT.

Witnesses:
EDWARD A. KLINE,
PAUL BEITT.